US008853951B2

(12) United States Patent
Garcia

(10) Patent No.: US 8,853,951 B2
(45) Date of Patent: Oct. 7, 2014

(54) METHOD OF ADJUSTING BRIGHTNESS BY DESIRED RUN TIME

(71) Applicant: Richard Jeff Garcia, Beaumont, CA (US)

(72) Inventor: Richard Jeff Garcia, Beaumont, CA (US)

(73) Assignee: Janlincia LLC, Yucaipa, CA (US)

( * ) Notice: Subject to any disclaimer, the term of this patent is extended or adjusted under 35 U.S.C. 154(b) by 124 days.

(21) Appl. No.: 13/682,020

(22) Filed: Nov. 20, 2012

(65) Prior Publication Data
US 2014/0139114 A1 May 22, 2014

Related U.S. Application Data

(60) Provisional application No. 61/629,547, filed on Nov. 21, 2011.

(51) Int. Cl.
H05B 37/02 (2006.01)

(52) U.S. Cl.
CPC .................................. H05B 37/02 (2013.01)
USPC .......................................... 315/151; 315/308

(58) Field of Classification Search
USPC ................. 315/149, 151, 152, 291, 307–309
See application file for complete search history.

(56) References Cited

U.S. PATENT DOCUMENTS

| 7,295,129 B2 * | 11/2007 | Eisenson ..................... 340/636.1 |
| 7,649,323 B1 * | 1/2010 | Kuhlmann et al. ....... 315/200 A |
| 2007/0133199 A1 * | 6/2007 | Lebens et al. ................. 362/157 |
| 2012/0091813 A1 * | 4/2012 | Spurlin et al. .................. 307/66 |
| 2012/0212944 A1 * | 8/2012 | Whitfield et al. ............. 362/184 |

* cited by examiner

Primary Examiner — Don Le

(57) ABSTRACT

A method for determining a light intensity based on current battery charge status and specified run time.

39 Claims, 3 Drawing Sheets

METHOD OF ADJUSTING BRIGHTNESS BY DESIRED RUN TIME

CROSS-REFERENCE TO RELATED APPLICATIONS

Figure 1:
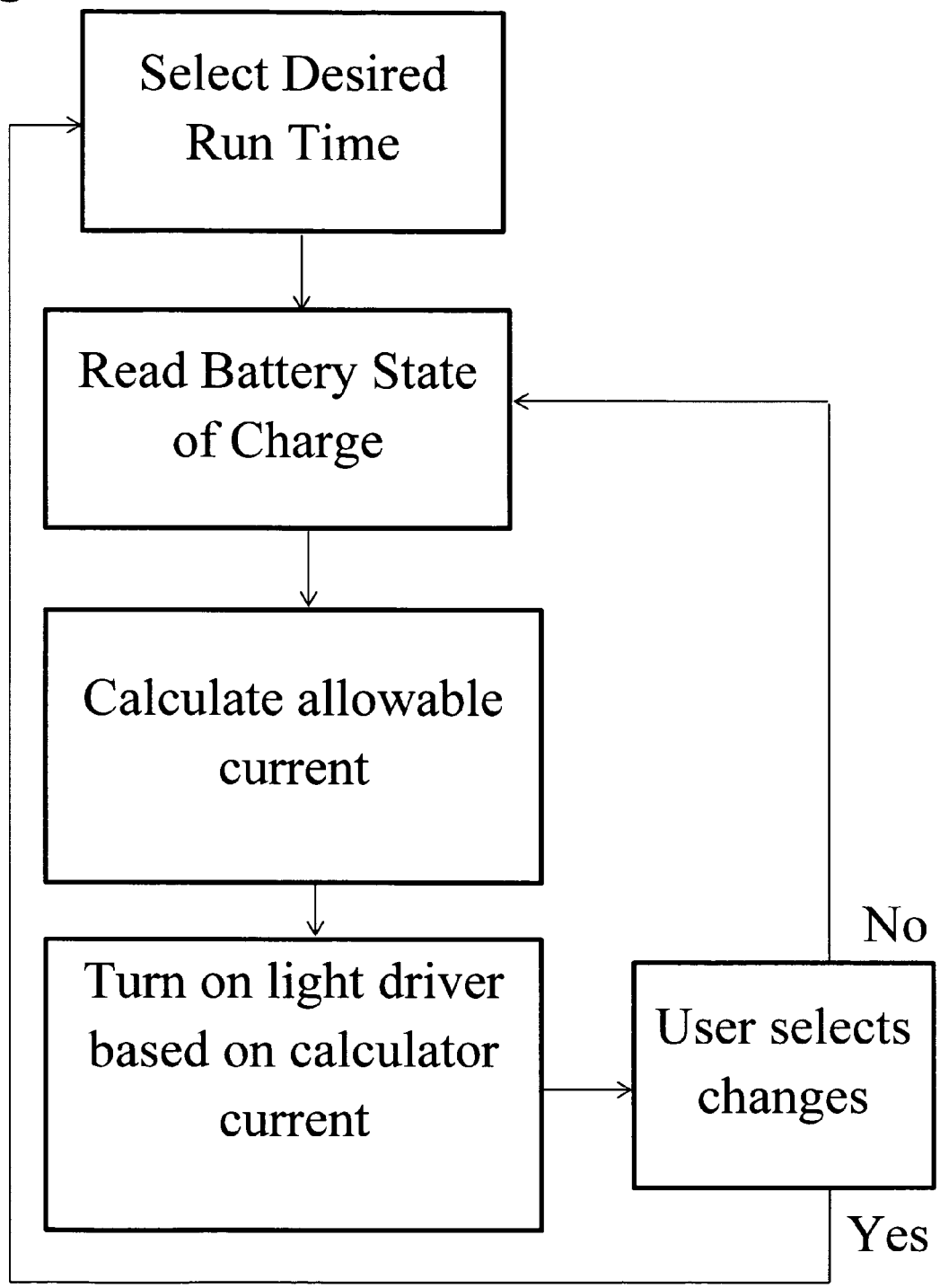

This application claims the benefit of provisional patent application 61/629,547 filed Nov. 21, 2011.

BACKGROUND

Prior Art

Portable lights are becoming increasingly common, especially as energy efficient LEDs allow the lights to be on longer. However, as portable lights fill more and more applications sometimes additional functionality is required. Sometimes new use cases arise that have not been previously considered and can not be well met with the existing product modes and features. Traditionally lights have been controlled with brightness as the factor being adjusted. For example portable lights often have a multiple intensity settings such as High, Medium, and Low. While people are aware that the High setting will use more power than the low setting, and thus cause the batteries to discharge sooner, the user will have little insight into the current state of battery charge and also how much battery life remains at a given brightness for the remaining battery charge. The current state of the art is to allow a portable light to have multiple settings and, at best, the instruction manual will sometimes mention how long the light may be on for a fully charged generic battery type on a given setting. For example, the manual might say that a flashlight will last four hours on alkaline batteries on high brightness mode. One particularly advanced system from Nite Rider in San Diego, Calif. even has D.I.Y. software that will estimate how long a fully charged set of batteries will last for a given brightness setting. None of these solutions solve the problem from the following scenario:

You have a portable light and you don't know the current charge status. You do know that you need the light to last for a given time, say two hours for this example. You want the light to be as bright as possible while still lasting as long as you need it to stay on. What do you do?

Not a single portable light on the market is able to meet the goal of being as bright as possible while still staying on for the entire desired time. The existing solutions only give you the option of estimates that assume fully charged batteries of an "average" capacity. There are several flaws with these assumptions.

The first flaw is assuming a fully charged battery. As soon as a battery is either made or removed from a charger, it starts to discharge. This means that rarely do you have a "fully charged battery". While some batteries self discharge faster than others, for example Lithium Ion is slower to self discharge than Nickel Metal Halide, all batteries self discharge to some degree. In addition people sometimes do not know how long the light has been on previously, especially for shared portable lights such as a flashlight in a kitchen drawer that might be used by multiple people in the family.

The next flaw is assuming "average battery capacity". Battery capacity varies from brand to brand, and in the case of rechargeable batteries it varies from charge to charge. Rechargeable batteries have reduced battery capacity as the battery gets older and has been charged multiple times. Whatever estimates the manufacturer gives you for how long the battery will last at a given brightness setting will be wrong over time even if they provide the rechargeable battery and know the initial capacity.

SUMMARY

The solution to the problem requires two things. First the capacity and charge of the battery at that moment must be known. Second, a method must exist to set the desired length of time for the light to stay on rather than specifying a specific brightness. If the battery charge is known and a desired time for the light to be on is known then the brightness can be adjusted so that the light will stay on for the entire specified length.

To apply this solution to the example scenario listed earlier with the new invention you would just set the light duration for two hours and then the light would adjust itself for the maximum brightness possible that can be maintained for the full two hours based on the current battery charge status.

The user interface itself could be implemented in a great many ways as all existing tinier based devices have some means of setting a desired duration and a means of starting the timer. This invention could use most if not all of these user interface methods as it also just needs a means to set the duration and a means to turn on the light, thus starting the count down. Since the user interface can be implemented in so many ways that would be known to one skilled in the art, I will focus on describing what constitutes this invention and how it might be implemented.

To determine the current battery charge there are two main methods. The first is to fully charge the battery and then try to keep track of how much electrical current is taken from the battery. These types of circuits are sometimes called Coulomb Counters since one unit for electrical current is the Coulomb. Some examples of this type of circuit are marketed by Texas Instruments, Maxim, Linear Technology, and others. The second general type of circuit tries to determine the battery charge status based on current voltage and, depending on the component supplier, sometimes other factors such as battery chemistry, temperature, or discharge rate. The invention could be implemented with either circuit since they both are designed to accomplish the task of determining battery charge at a given point in time. For the present embodiment I used a Maxim 17040 Fuel Gauge as the key circuit component that detects the current state of battery charge. This part is designed for determining the percent of charge for lithium ion batteries and expresses the current charge as an eight bit percent from $1/256$% to $255/256$%. For the present embodiment a single lithium ion battery is used that has a maximum capacity of 6 Amp Hours when fully charged.

The circuit would also need some additional building blocks, such as a means to drive the light that can be varied depending upon the available power. There are quite a few different lighting control mechanisms and someone skilled in the art would have several options open to them. For the sake of this application we will pick one and use it throughout the example even though other options exist outside this example. For the present embodiment the light is comprised of a single high power Cree XM-L LED that has a maximum current of 3 Amps. For the present embodiment the LED driver is controlled by pulse width modulation (PWM) which is generated by the control circuit.

Advantages Over Prior Art

The advantages over the prior art are best illustrated by continuing with the example cited earlier. The prior art has no way to address the problem. Here is how this new approach solves the problem.

In this example the user has input that they need the light on for two hours, and we have a means of determining the current battery charge using the Maxim 17040. Note that a 6 Ah battery should, in theory, be able to keep a 3 A LED on for two hours if it is fully charged. However, what if the battery is only 50% charged. This may be because the battery has been idle for a while and self discharged, or because it was used previously and not recharged, or for both these reasons. In any case, for this example assume the battery is only 50% charged.

So once the user starts the light for the desired duration, 2 hours in this example, several things happen. The control circuit reads the current level of battery charge, which is 50% or 3 Ah. Then the control circuit calculates the LED brightness by taking (3 Amp hours)/(2 hours)=1.5 Amps. So 1.5 A is the desired level of average LED current. This is easily accomplished using a 50% duty cycle for the PWM controlling the LED driver. This is the simplest case. Note that some bounds would have to be applied so that if the math worked out to a higher current than the light system was rated for then instead it would just run at full rated power.

There are a couple of downsides to the simplest case. First, it didn't take into account the extra current drawn by the control circuit, user interface, and other parts of the circuit. Since the designer can easily measure the current that the circuits require this is easily compensated for. Indeed, the extra current may be so small compared to the light power requirement that it is insignificant and doesn't need to be included. Second, it had no margin for error. The easiest way to have margin for error is to not do the calculation using the full reported battery charge. The second way to have margin for error is to periodically check the remaining battery charge against the remaining time to see if they correlate. For example, if at the one hour mark the battery only has 20% charge remaining instead of the expected 25% then the light will not be able to be on for the full 2 hours. This is why the preferred embodiment would regularly check the remaining battery level against the remaining time and make adjustments as needed as shown in FIG. 1. These adjustments would ideally be made in small increments so that they are not noticed by the user and thus are not a distraction. Additional factors that could be used for a more precise estimate of how to calculate the best average LED current flow include temperature and the average current value itself. It is well known that batteries realize less energy when rapidly discharged as opposed to a more gradual discharge over a longer period of time. So if the average LED current was 3 A that would realize less energy from the same battery than if the average LED current was 1 A. A more sophisticated model could include this factor.

So for our example lets say that the circuitry requires 15 mA. 15 mA is negligible compared to the lighting current which will typically be over 10 times greater so it will be ignored. To allow for a margin of error though the battery capacity used for calculations will only be 90% of what is reported, thus leaving a 10% reserve. This means that the LED current will be an average of (3 Ah*0.9)/(2 hours)=1.35 A. This translates to a PWM duty cycle of 45% which can easily be implemented. As an additional protection to make sure that the two hour time is met the control circuit will check the remaining battery status every second against the time remaining and make adjustments as required as shown in FIG. 1.

There are other benefits that such a product could offer. Since the battery charge is being monitored, batteries that are faulty can be reported. That is, if a battery reports an initial capacity but in practice it realizes little of that capacity then it can be reported to the user as a faulty battery. Alternatively, the system could learn to recognize the true capacity of the battery and adjust the reserve amount to compensate. Recognizing the true capacity of a battery and making adjustments is particularly useful for systems where the battery is not readily changed and so the same battery will likely be used time after time. Another reason for adjusting to the true capacity of the battery is that some aftermarket batteries may either not accurately list their capacity or possibly not list it at all. In either of these cases the system would detect fairly quickly that the battery was not being drained at the expected rate and could adjust the size of the battery used in the calculations. The reserve setting could be a setting that the user could adjust. The reserve setting could be either a certain amount of time, likely measured in minutes, or it could be a percentage as was done in the example above.

One final point that can be adjusted is how much the light is allowed to deviate from 100%. For example, the LED driver may not be able to fully drive the LEDs if the LED driver operates outside the 100% region. An easy example would be a linear LED driver. At a certain point, probably around 3.3 v for a single LED, the linear driver will be operating fully in the on position yet the current will not be 100% of what was intended. That is to say the regulator will fall out of regulation. When this first happens it may not be noticed. For example when only 99% of rated LED current is possible it probably won't be noticed. Along the same lines 98% may not be noticed either. However at some point the decline in LED current will be noticeable. A possible user setting would be how far the driver can be outside the rated amount while still be considered being useful.

An additional benefit of such a system is that it could respond to emergencies by temporarily turning the light on to full strength for a short period and then reset the calculation when the emergency was over. For example lets say that 40 minutes into the two hour trip example an emergency happens and the user needs maximum light for 15 minutes. 40 minutes into the trip the remaining battery charge has been drawn down from 3 Ah to 2 Ah. 15 minutes of full power, that is 3 A for this example, means that the battery capacity was further drawn down to 1.25 Ah. So now the user has 1.25 Ah to light the way for the next 80 minutes, or 1.33 hours. The math now works out to be (1.25 Ah*0.9)/(1.33 hours)=846 mA. The control circuit would now use a PWM of 28.2% and the user would have less light for the remainder of the trip but at least the light would last the full remainder of the trip. Optionally the reserve period could be reduced to increase the light slightly. The key advantage here is that it is better to have a dim light that lasts the entire time it is needed than to run out of light before you have arrived at your destination.

The inverse of the preceding example would also be true. If the user was in an area that was already well lit for a time they could suspend the light output. This would have the effect of increasing available battery charge when the needed the light again. For example, lets say that the user above who was last down to 1.33 hours remaining and 846 mA of average LED current goes through an area that is well lit when he has 1 hour remaining. He suspends light output for 15 minutes and when he needs the light again the situation is that he has 45 minutes of light duration still remaining of the original 2 hours. However the battery is at 0.94 Ah, so the average LED calculation now works out to (0.94*0.9)/(0.75 hours)=1.13 A. This means that by turning off the light while it was not needed, but by still running the timer, portions of a trip that are already well lit can be taken advantage of. Optionally, this process could be automated by using ambient light sensors so that when a well lit area is detected the light dims down or turns off, but when the area is no longer well lit the light comes back on based on the remaining battery charge and remaining duration required.

One final example of the utility of this system is for systems that expect a certain number of events instead of a constant light. For example, imagine a light system that is powered by solar charged batteries. Since the batteries are solar charged, they may not always be at full charge depending on the weather and sun exposure. If the light system needed by be able to run for a given number of bursts, for example 30 cycles where the light was on for two minutes per cycle at up to 3 A. In this case if at the start of a cycle the battery was charged to 4 Ah, regardless of the full capacity, the lighting system would run at the full 3 A since (4 Ah*0.9)/(30*2 min)=3.6 A. In this case the maximum current rating of the lighting system was the deciding factor. If the battery had only been charged to 2 Ah then the math would have been (2 Ah*0.9)/(30*2 min)=1.8 A.

In these examples the battery capacity was given initially. However that battery capacity may be wrong for one or more reasons including use of after market batteries, use of different battery brands, the battery capacity diminishes over time with recharge cycles, etc. If the battery capacity used in the calculations in incorrect then of course the calculations will be incorrect. Fortunately this can be accounted for.

The system can allow the user to specify the battery capacity, so that in the case of the user replacing or upgrading a battery the new battery capacity can be specified. The battery capacity detection can also be automated. Since the system is automatically rechecking the battery status periodically, if the measured battery discharge rate does not match the expected battery discharge rate then the capacity can be calculated based on how fast the battery is actually discharging. This whole process can be automated and transparent to the user. This also allows the system to continue using a battery even as the battery capacity diminishes due to recharge cycles.

Summary of Advantages Over Prior Art (A) User can specify how long they want the light to be on, which is a preferred way of interacting with a light in certain situations where running out of light early would be a problem.
(B) User does not need to know the current battery charge status for the system to work.
(C) The user will get maximum power from the battery.
(D) The system will automatically adjust the battery capacity used in the calculations if the battery is discharging faster than calculated.

DRAWINGS

Figures

Figure 2:
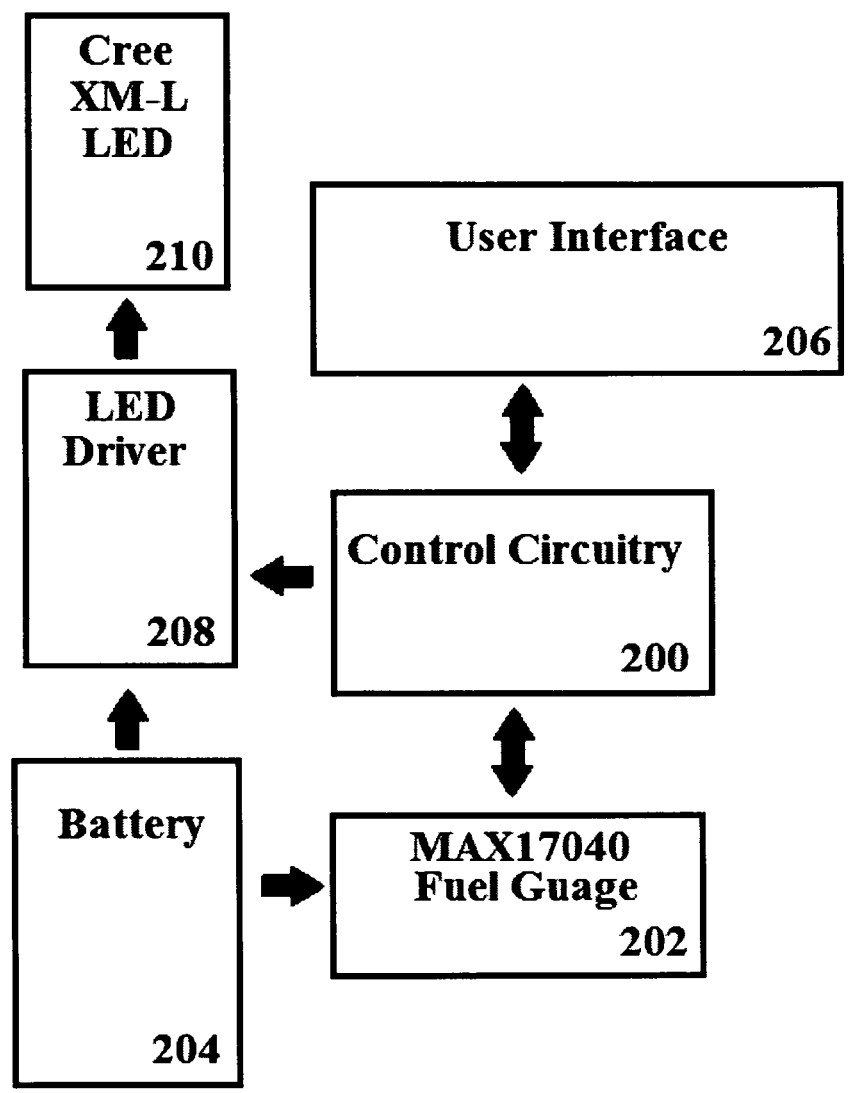
Figure 3:
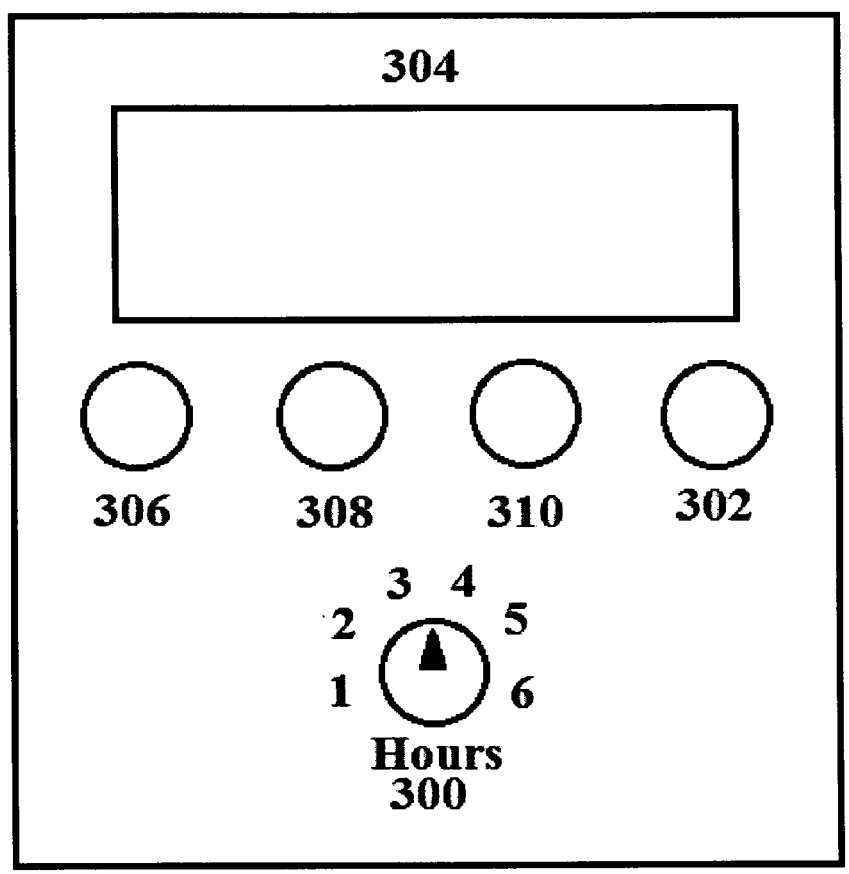

FIG. 1 is a flow chart showing operation
FIG. 2 is a block diagram that shows one embodiment
FIG. 3 is one embodiment of a simple user interface

DRAWINGS

Reference Numerals

200 Control circuit
202 MAX17040 Fuel Gauge
204 Lithium Ion battery
206 User interface
208 LED driver
210 Cree XM-L LED
300 Dial for time
302 Start button
304 LCD display
306 Increase brightness button
308 Decrease brightness button
310 Light off button

DETAILED DESCRIPTION

FIG. 1

FIG. 1 shows the basic control loop between fuel gauge 202, control circuit 200, and LED driver 208 based on the remaining charge in battery 204.

DETAILED DESCRIPTION

FIG. 2

FIG. 2 shows the overall system block diagram.

DETAILED DESCRIPTION

FIG. 3

FIG. 3 shows a simple user interface. Dial 300 is used to set how long the desired run time for the light is. The selected time will be shown on LCD display 304. Button 306 is used when the light is desired to be brighter, while button 308 is used for making the light go dimmer. The effects of buttons 306 and 308 on the possible run time can be displayed on display 304 as changes are made. Once Start button 302 is pressed then display 304 counts the remaining run time down. To turn the light off just press button 310.

Operation

First Embodiment

First the user selects how long the desired run time is using dial 300. Once start button 302 is pressed the display 304 will show the remaining run time and also other related information like current battery charge. In this time based lighting mode the control loop of FIG. 1 is followed where the remaining battery charge is periodically measured, a calculation is made where remaining battery charge, remaining run time, and battery reserve are all used to calculate how much current LED driver 208 can use on average to power LED 210. Since this process is repeatedly done any errors in the battery charge measurement can be quickly corrected. Note that the changes to the current used by LED driver 208 can be phased in over multiple PWM cycles so that no abrupt change is noticed by the user. Should the user need to deviate from time based lighting buttons 306 and 308 can be used for brighter and dimmer respectively. As changes are made with buttons 306 and 308 the resulting change in possible run time will be shown on display 304.

Operation

Alternate Embodiments

There are several alternate embodiments that are readily apparent. The first is that there is a virtually unlimited of possible user interfaces, light driver circuits, and battery monitor circuits. What is novel is using the current battery charge and desired run time to calculate how much power the lighting driver circuit should use as averaged over time. The alternative embodiments for current battery charge involve what method is used to determine battery charge and what reserve is set aside. In terms of desired run time, the alternative embodiments include how much the light is allowed to decline while still being considered useful and what the limits of the driver circuit are.

Another alternative embodiment is to use the process in reverse. So instead of setting a desired run time and then calculating how long the light will last, the user can set the desired light intensity and then have the system calculate how long that intensity can be maintained based on the current battery charge status. Conveniently, the same hardware can implement both methods with almost no extra cost.

CONCLUSION, RAMIFICATIONS, AND SCOPE

Accordingly the reader will see that, according to one embodiment of the invention, the process of determining a light intensity based on battery charge and desired run time offers many advantages over more traditional lighting interfaces. Situations, such as the ones given already, can be easily handled with this new method while traditional methods of lighting control would simply not be able to address the situation. While a virtually unlimited number of user interfaces exist, and a great many lighting driver circuits exist, the process of using desired run time and battery charge is unique in the portable lighting market.

While my above description contains many specificities, these should not be construed as limitations on the scope, but rather as an exemplification of one preferred embodiment thereof. Many other variations are possible. For example, any number of possible battery monitor circuits exist and could be used instead of Maxim MAX17040 Fuel Gauge.

I claim:

1. A lighting control system comprising: a battery charge measurement circuit, a user interface for inputting commands to the controller, a controller controlling the operation of a light source and configured to implement a plurality of modes of operation, wherein said controller includes one mode of operation where battery charge status is used along with an indicated run time to determine what intensity said light controller should operate at.

2. The system of claim 1 where as the light intensity is manually changed battery charge status from said battery charge measurement circuit is used to calculate how long the light can run at the selected light intensity before discharging the battery.

3. The system of claim 1 where a battery reserve is set kept separate from the light intensity calculations.

4. The system of claim 1 where a light sensor is used to automatically dim the light if enough ambient light is detected.

5. The system of claim 1 where a light sensor is used to automatically turn off the light if enough ambient light is detected.

6. The lighting control system of claim 1 where the calculated light intensity is such that it will be approximately constant over the indicated run time.

7. The lighting control system of claim 1 where the light intensity is allowed to decline by a certain amount when calculating what intensity will satisfy the indicated run time.

8. The lighting control system of claim 1 where if the calculated battery discharge rate does not match the measured battery discharge rate then the battery capacity used in the calculation is adjusted based on the measured battery capacity.

9. A multi-mode portable electronic lighting device comprising: a light source; a battery charge measurement circuit; a user interface for inputting commands to the controller; a controller controlling the operation of said light source wherein said controller includes one mode of operation where battery charge measurement is used along with an indicated run time to determine what intensity said light source should operate at.

10. The device of claim 9 where a battery reserve is set kept separate from the light intensity calculations so that when the indicated run time has passed the battery still has the reserve charge remaining.

11. The device of claim 9 where a light sensor is used to automatically dim the light if enough ambient light is detected.

12. The device of claim 9 where a light sensor is used to automatically turn off the light if enough ambient light is detected.

13. The device of claim 9 where the light intensity is allowed to decline by a certain amount when calculating what intensity will satisfy the indicated run time.

14. The device of claim 9 where if the calculated battery discharge rate does not match the measured battery discharge rate then the battery capacity used in the calculation is adjusted based on the measured battery capacity.

15. A method for calculating the intensity of a portable light based on present battery charge and desired run time, where the calculated intensity will be such that it can stay approximately constant over the desired run time based on the battery charge.

16. The method of claim 15 where the present battery charge is input from the user.

17. The method of claim 15 where the present battery charge is automatically detected.

18. The method of claim 15 where the battery charge is periodically checked and the light intensity recalculated based on the most recent battery charge information.

19. The method of claim 15 where a reserve charge is set aside and so the full present battery charge is not used for the calculations but instead the remaining present battery charge less the reserve battery charge is used.

20. The method of claim 15 where instead of having the light intensity be approximately constant over the desired run time instead the light intensity is allowed to decline by a certain amount.

21. The method of claim 15 where a light sensor is allowed to automatically dim the light if enough ambient light is detected.

22. The system of claim 15 where a light sensor is used to automatically turn off the light if enough ambient light is detected.

23. The method of claim 15 where if the calculated battery discharge rate does not match the measured battery discharge rate then the battery capacity used in the calculation is adjusted based on the measured battery capacity.

24. A method for calculating the intensity of a back light based on battery charge and desired run time, where the calculated intensity will be such that it can stay approximately constant over the desired run time based on the battery charge.

25. The method of claim 24 where the battery charge is input from the user.

26. The method of claim 24 where the battery charge is automatically detected.

27. The method of claim 24 where the battery charge is periodically checked and the light intensity recalculated based on the most recent battery charge information.

28. The method of claim 24 where a reserve charge is set aside and so the full present battery charge is not used for the calculations but instead the remaining present battery charge after the reserve charge has been set aside is used.

29. The method of claim 24 where instead of having the light intensity be approximately constant over the desired run time instead the light intensity is allowed to decline by a certain amount.

30. The method of claim 24 where a light sensor is allowed to automatically adjust the light if enough ambient light is detected.

31. A method for calculating the run time of a portable light based on present battery charge and desired light intensity, where the calculated run time will be such that it can stay approximately constant over the desired light intensity based on the battery charge.

32. The method of claim 31 where the present battery charge is input from the user.

33. The method of claim 31 where the present battery charge is automatically detected.

34. The method of claim 31 where the battery charge is periodically checked and the run time recalculated based on the most recent battery charge information.

35. The method of claim 31 where a reserve charge is set aside and so the full present battery charge is not used for the calculations but instead the remaining present battery charge less the reserve battery charge is used.

36. The method of claim 31 where instead of having the light intensity be approximately constant over the calculated run time instead the light intensity is allowed to decline by a certain amount.

37. The method of claim 31 where a light sensor is allowed to automatically dim the light if enough ambient light is detected.

38. The system of claim 31 where a light sensor is used to automatically turn off the light if enough ambient light is detected.

39. The method of claim 31 where if the calculated battery discharge rate does not match the measured battery discharge rate then the battery capacity used in the calculation is adjusted based on the measured battery capacity.

\* \* \* \* \*